(12) United States Patent
Takagi et al.

(10) Patent No.: US 7,511,876 B2
(45) Date of Patent: Mar. 31, 2009

(54) DISPERSION FOR ELECTROPHORETIC DISPLAY, AND ELECTROPHORETIC DISPLAY DEVICE

(75) Inventors: Shinya Takagi, Kanagawa (JP); Akiko Iimura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 608 days.

(21) Appl. No.: 10/445,193

(22) Filed: May 27, 2003

(65) Prior Publication Data
US 2004/0027643 A1 Feb. 12, 2004

(30) Foreign Application Priority Data
May 30, 2002 (JP) .............................. 2002-157911

(51) Int. Cl.
*G02B 26/00* (2006.01)
(52) U.S. Cl. ........................ 359/296; 359/292; 359/295
(58) Field of Classification Search ................. 359/296, 359/295, 298, 290, 291, 292
See application file for complete search history.

(56) References Cited

U.S. PATENT DOCUMENTS 3,612,758 A 10/1971 Evans et al. ............... 178/5.4 R

| | | | | | |
|---|---|---|---|---|---|
| 5,382,928 | A | * | 1/1995 | Davis et al. ................... | 333/182 |
| 5,466,654 | A | * | 11/1995 | Akutsu et al. ................ | 503/206 |
| 6,514,328 | B1 | * | 2/2003 | Katoh et al. .............. | 106/31.28 |
| 6,693,621 | B1 | * | 2/2004 | Hayakawa et al. ........... | 345/107 |
| 2002/0188053 | A1 | * | 12/2002 | Zang et al. .................... | 524/474 |

FOREIGN PATENT DOCUMENTS

| JP | 61-25139 | 2/1986 |
|---|---|---|
| JP | 1-105990 | 4/1989 |
| JP | 3-53224 | 3/1991 |
| JP | 9-185087 | 7/1997 |
| JP | 2000-227612 | 8/2000 |

* cited by examiner

*Primary Examiner*—Ricky L Mack
*Assistant Examiner*—Brandi N Thomas
(74) *Attorney, Agent, or Firm*—Fitzpatrick, Cella, Harper & Scinto (57) ABSTRACT

In a dispersion for electrophoretic display, used in an electrophoretic display device having i) charged electrophoretic particles and ii) a dispersion medium in which the charged electrophoretic particles stand dispersed, the dispersion medium contains at least one of an ethylene acrylate copolymer and a styrene copolymer. The styrene copolymer is in a content of from 0.0001 part by weight to 3 parts by weight based on 100 parts by weight of the dispersion medium.

6 Claims, 4 Drawing Sheets

FIG. 1A (OBSERVER SIDE)  FIG. 1B (OBSERVER SIDE)

FIG. 2A (OBSERVER SIDE)  FIG. 2B (OBSERVER SIDE)

FIG. 3A
(OBSERVER SIDE)

FIG. 3B
(OBSERVER SIDE)

FIG. 5A
(OBSERVER SIDE)

FIG. 5B
(OBSERVER SIDE)

FIG. 6A
(OBSERVER SIDE)

FIG. 6B
(OBSERVER SIDE)

DISPERSION FOR ELECTROPHORETIC DISPLAY, AND ELECTROPHORETIC DISPLAY DEVICE

BACKGROUND OF THE INVENTION

1. Field of the Invention

This invention relates to a dispersion for electrophoretic display and an electrophoretic display device making use of the dispersion for electrophoretic display, which performs display by movement of charged electrophoretic particles between electrodes.

2. Related Background Art

In recent years, with advancement of information machinery, there is an increasing need for display devices of low power consumption and small thickness, and research and development are energetically made on display devices adapted for such need. In particular, liquid crystal display devices can change optical characteristics of liquid crystal by controlling the alignment of liquid crystal molecules electrically, and they have energetically been developed and have been commertialized as display devices that can accord with the above need.

From the viewpoints of low power consumption and less tasking eyesight, hopes are entertained of reflection type display devices. As one of them, the electrophoretic display device invented by Harold D. Lees et al. is known in the art (U.S. Pat. No. 3,612,758). Besides, an electrophoretic-display device is also disclosed in Japanese Patent Application Laid-Open No. 9-185087. This electrophoretic display device is described below.

Figure 5A:
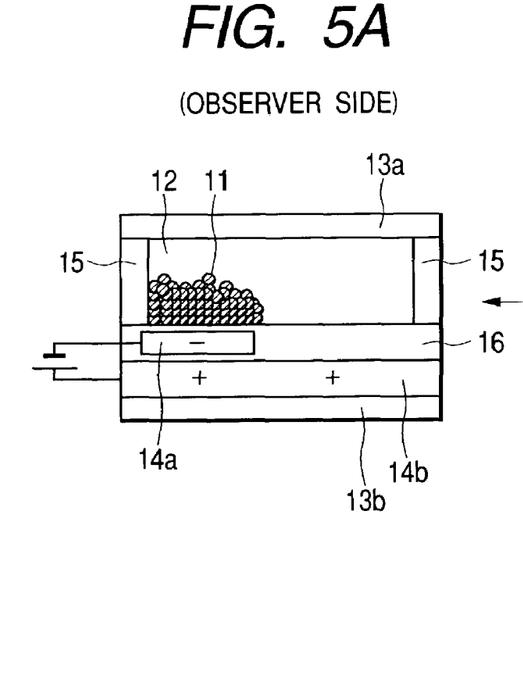
FIGS. 5A and 5B are schematic views showing an example of the structure of a conventional electrophoretic display device.
Figure 5B:
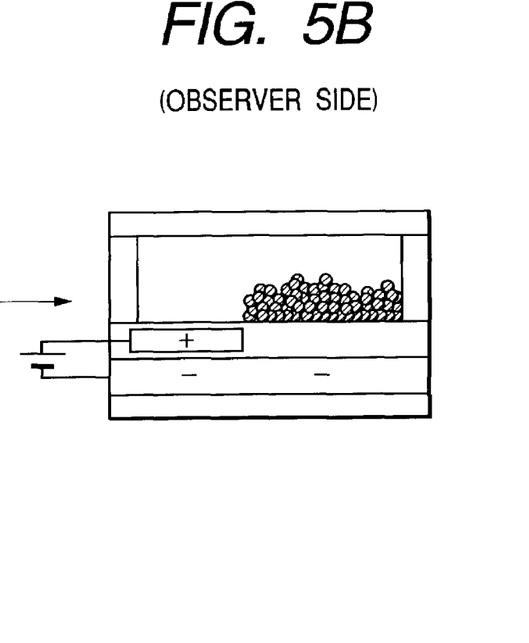

FIGS. 5A and 5B illustrate an example of the structure of such an electrophoretic display device (an example in which particles move horizontally). The electrophoretic display device of this type is constituted of a pair of substrates 13a and 13b disposed leaving a stated space between them, a dispersion medium 12 with which the space between the substrates is filled, charged electrophoretic particles 11 stand dispersed in the dispersion medium 12, a first electrode 14a and a second electrode 14b which are so disposed as to lie along one substrate 13b, partition walls 15 so disposed as to divide the space between the substrates 13a and 13b for each pixel, and an insulating layer 16.

In this device, the charged electrophoretic particles 11 are kept charged to positive polarity or negative polarity (those shown in FIGS. 5A and 5B are kept charged to positive polarity), and hence they migrate electrically to either of the electrodes 14a and 14b in accordance with the polarity of a voltage applied to the electrodes 14a and 14b. Areas in which the charged electrophoretic particles 11 and the electrodes 14a and 14b are disposed stand colored, and hence the display device can display an image as a whole.

Figure 6A:
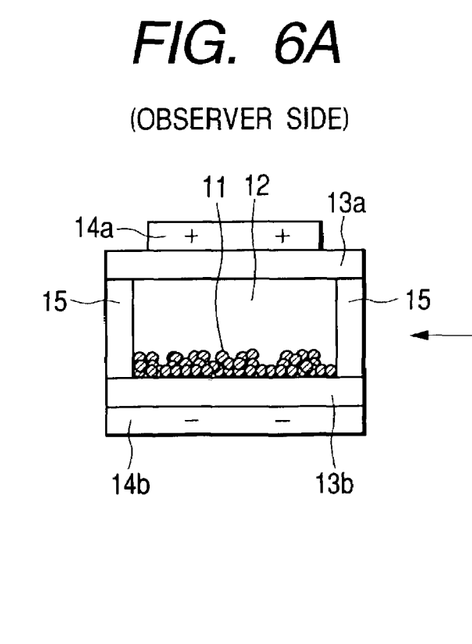
FIGS. 6A and 6B ate schematic views showing another example of the structure of a conventional electrophoretic display device.
Figure 6B:
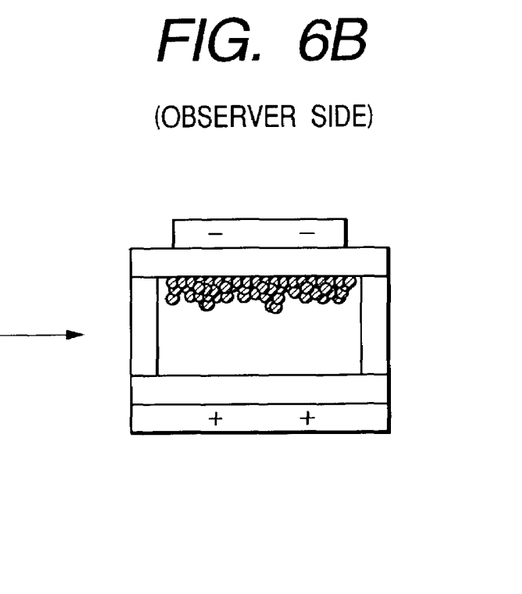

FIGS. 6A and 6B illustrate an example of an electrophoretic display device in which particles move vertically. In FIG. 6A, the same reference numerals as those in FIG. 5A denote like constituent members. In the device shown in FIGS. 6A and 6B, the dispersion medium 12 is colored a color different from the charged electrophoretic particles 11 so that an image can be displayed. In either of the electrophoretic display devices shown in FIGS. 5A, 5B, 6A and 6B, the distance between both substrates is kept constant by the partition walls 15. As the result, these electrophoretic display devices can perform high-contrast display at reflection-type angles of view.

In such electrophoretic display devices, there is a problem that the charged electrophoretic particles may agglomerate with time of electrophoresis or the charged electrophoretic particles may adhere to electrode surfaces and inner-wall surfaces, to cause a lowering of contrast. Thus, from the viewpoint of improving display stability, their performance is desired to be more improved.

In order to improve the display stability of electrophoretic display devices, various proposals have been made.

For example, Japanese Patent Application Laid-Open No. 1-105990 discloses a proposal that, charged electrophoretic particles of 0.001 μm to 0.1 μm in diameter are used so as to maintain the dispersibility of particles stably by the aid of the Brownian movement of charged electrophoretic particles.

Japanese Patent Application Laid-Open No. 3-53224 discloses a proposal that a vibrator fitted to a cell which makes charged electrophoretic particles undergo electrophoresis is used so as to keep the particles from agglomerating or keep the particles from adhering to the electrode surfaces and inner-wall surfaces, to maintain display quality for a long time.

Japanese Patent Application Laid-Open No. 2000-227612 discloses a proposal that hollow resin particles coated with a pigment or pigment particles made hollow or porous are used as charged electrophoretic particles to make small the difference in specific gravity between the particles and the dispersion medium to improve long-term dispersibility of the particles.

Japanese Patent Publication No. 61-25139 discloses a proposal that charged electrophoretic particles or electrode substrates are coated with a fluorine resin so as to keep the particles from agglomerating or keep the particles from adhering to the electrode surfaces to obtain a practical display device.

These proposals, however, can not be said to have sufficiently solved the above problem.

SUMMARY OF THE INVENTION

The present invention was made taking account of such a problem the prior art has had. Accordingly, an object of the present invention is to provide, with ease and at a low cost, a dispersion for electrophoretic display which can keep charged electrophoretic particles from agglomerating or keep the particles from adhering to the electrode surfaces and inner-wall surfaces, and an electrophoretic display device making use of such a dispersion, which can maintain a stable image condition.

Taking account of the above problem, the present inventors have repeatedly made extensive studies. As the result, they have discovered that the charged electrophoretic particles can be kept from agglomerating and the particles can be kept from adhering to the electrode surfaces and inner-wall surfaces when a specific high-molecular resin is contained in a dispersion medium in which the charged electrophoretic particles stand dispersed. As the result, they have discovered that the image condition of electrophoretic display can stably be maintained, and have accomplished the present invention.

More specifically, the present invention is a dispersion for electrophoretic display, used in an electrophoretic display device having i) charged electrophoretic particles and ii) a dispersion medium in which the charged electrophoretic particles stand dispersed, wherein the dispersion medium contains at least one of an ethylene acrylate copolymer and a styrene copolymer, the stylene copolymer being in a content of from 0.0001 part by weight to 3 parts by weight based on 100 parts by weight of the dispersion medium.

The present invention is also an electrophoretic display device having a pair of substrates, electrodes formed on the substrates, charged electrophoretic particles held between the substrates, and a dispersion in which the charged electrophoretic particles stand dispersed, wherein the electrophoretic display device comprises the above dispersion for electrophoretic display.

DESCRIPTION OF THE PREFERRED EMBODIMENTS

The present invention is described below in detail.

The electrophoretic display device of the present invention is characterized in that, in an electrophoretic display device having a pair of substrates, electrodes formed on the substrates, charged electrophoretic particles held between the substrates, and a dispersion medium in which the charged electrophoretic particles stand dispersed, the dispersion medium contains at least one of an ethylene acrylate copolymer and a styrene copolymer; the latter being in a content of from 0.0001 to 3 parts by weight based on 100 parts by weight of the dispersion medium.

Embodiments of the present invention are described below with reference to FIGS. 1A and 1B, 2A and 2B, 3A and 3B, and 4A to 4E. Incidentally, these drawings are cross-sectional views showing the structure of the electrophoretic display device according to the present invention, and are each a diagrammatic illustration of only one pixel for the sake of convenience.

Figure 1A:
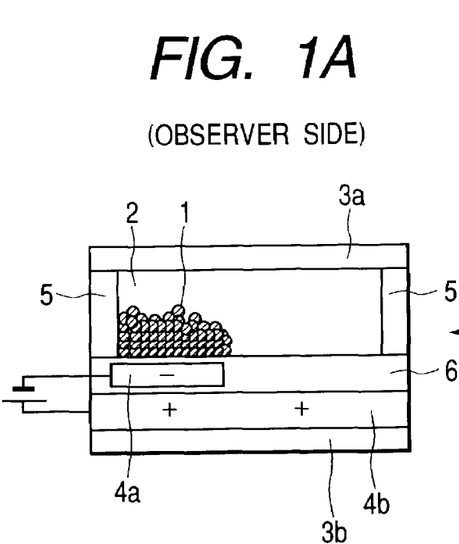
FIGS. 1A and 1B are schematic views showing an example of the structure of the electrophoretic display device according to the present invention.
Figure 1B:
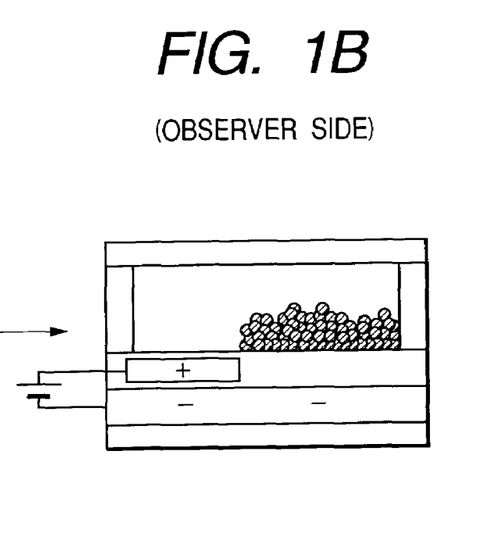
Figure 2A:
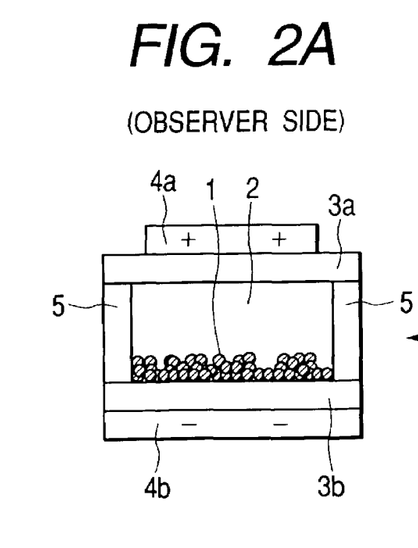
FIGS. 2A and 2B are schematic views showing another example of the structure of the electrophoretic display device according to the present invention.
Figure 2B:
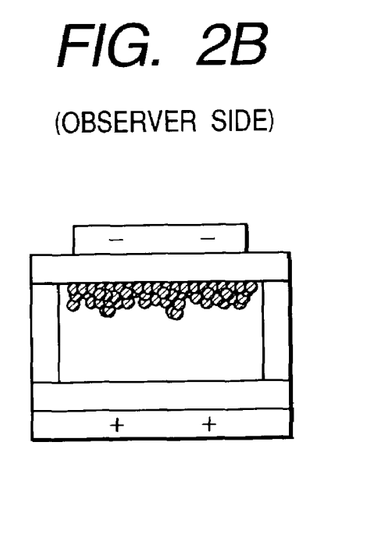

The present invention may be applied to what is called the horizontal-movement type, i.e., an electrophoretic display device in which charged electrophoretic particles 1 move horizontally (see FIGS. 1A and 1B) and also to what is called the vertical-movement type, i.e., an electrophoretic display device in which charged electrophoretic particles 1 move vertically (see FIGS. 2A and 2B). Here, the horizontal-movement type is meant to be a device which is so constructed that, as shown in FIGS. 1A and 1B, both a first electrode 4a and a second electrode 4b are disposed along either of substrates 3a and 3b and the charged electrophoretic particles 1 move along the substrates 3a and 3b. In contrast thereto, the vertical-movement type is meant to be a device which is so constructed that, as shown in FIGS. 2A and 2B, a first electrode 4a and a second electrode 4b are disposed on the different substrate side and the charged electrophoretic particles 1 move in the vertical direction (generatrix direction) with respect to the substrates 3a and 3b. Incidentally, the charged electrophoretic particles shown in FIGS. 1A and 1B and FIGS. 2A and 2B are shown as those kept charged to positive polarity. Also, reference numeral 5 denotes partition walls, and 6 an insulating layer. In the following drawings, the same reference numerals denote like constituent members.

The horizontal-movement type electrophoretic display device shown in FIGS. 1A and 1B is described as an example.

The electrophoretic display device according to the present invention has, as shown in FIGS. 1A and 1B, a plurality of charged electrophoretic particles 1 and a dispersion medium 2 in which the charged electrophoretic particles 1 stand dispersed, and is so constructed that the charged electrophoretic particles 1 are moved by applying a voltage so as to display an image in accordance with such movement.

The electrophoretic display device of the present invention makes use of the charged electrophoretic particles 1 and the dispersion medium 2 in which the charged electrophoretic particles 1 stand dispersed.

The dispersion for electrophoretic display according to the present invention is characterized in that at least one copolymer selected from an ethylene acrylate copolymer and a styrene copolymer is contained in the dispersion medium 2 in which the charged electrophoretic particles 1 stand dispersed.

Stated specifically, this dispersion includes (i) a case in which an ethylene acrylate copolymer is contained in the dispersion medium, (ii) a case in which a styrene copolymer is contained in the dispersion medium, and (iii) a case in which an ethylene acrylate copolymer and a styrene copolymer are contained in the dispersion medium.

The content of the ethylene acrylate copolymer and/or the styrene copolymer in the dispersion medium in the above cases (i) to (iii) is shown below.

(1) In the case (i), in which an ethylene acrylate copolymer is contained in the dispersion medium, the ethylene acrylate copolymer may be contained in the dispersion medium in an amount ranging from 0.0001 to 1 part by weight, preferably from 0.001 to 1 part by weight, and more preferably from 0.001 to 0.3 part by weight, based on 100 parts by weight of the dispersion medium. If the ethylene acrylate copolymer is contained in the dispersion medium in an amount of less than 0.0001 part by weight, the charged electrophoretic particles may come agglomerated or the particles may greatly adhere to the electrode surfaces and inner-wall surfaces, undesirably. If on the other hand the ethylene acrylate copolymer is contained in an amount of more than 1 part by weight, the ethylene acrylate copolymer may come precipitated, undesirably.

(2) In the case (ii), in which a styrene copolymer is contained in the dispersion medium, the styrene copolymer may be contained in the dispersion medium in an amount ranging from 0.0001 to 3 parts by weight, preferably from 0.001 to 2 parts by weight, and more preferably from 0.01 to 1 part by weight, based on 100 parts by weight of the dispersion medium. If the styrene copolymer is contained in the dispersion medium in an amount of less than 0.0001 part by weight, the charged electrophoretic particles may come agglomerated or the particles may greatly adhere to the electrode surfaces and inner-wall surfaces, undesirably. If on the other hand the styrene copolymer is contained in an amount of more than 3 parts by weight, the dispersion may have a high viscosity, undesirably.

(3) In the case (iii), in which both an ethylene acrylate copolymer and a styrene copolymer are contained in the dispersion medium, the ethylene acrylate copolymer may be contained in the dispersion medium in an amount ranging from 0.0001 to 1 part by weight, preferably from 0.001 to 1 part by weight, and more preferably from 0.001 to 0.3 part by weight, based on 100 parts by weight of the dispersion medium. Also, the styrene copolymer may be contained in the dispersion medium in an amount ranging from 0.0001 to 3 parts by weight, preferably from 0.001 to 2 parts by weight, and more preferably from 0.01 to 1 part by weight, based on 100 parts by weight of the dispersion medium. If the ethylene acrylate copolymer is contained in the dispersion medium in an amount of less than 0.0001 part by weight and the styrene copolymer is contained in an amount of less than 0.0001 part by weight, the charged electrophoretic particles may become agglomerated or the particles may greatly adhere to the electrode surfaces and inner-wall surfaces, undesirably. If on the other hand the ethylene acrylate copolymer is contained in the dispersion medium in an amount of more than 1 part by weight and the styrene copolymer is contained in an amount of more than 3 parts by weight, the ethylene acrylate copolymer and ethylene acrylate copolymer may come precipitated, undesirably.

On the ethylene acrylate copolymer used in the present invention, there are no particular limitations as long as it is capable of dissolving in the dispersion medium when used within the range of the present invention. It may specifically include an ethylene methyl acrylate copolymer, an ethylene ethyl acrylate copolymer, an ethylene propyl acrylate copolymer and an ethylene butyl acrylate copolymer, any of which may be used alone or in the form of a mixture of two or more. In particular, an ethylene ethyl acrylate copolymer is preferred, and, as commercially available materials, usable are, e.g., NUC Copolymers DPDJ6169, DPDJ9169, NUC6221, NUC6220, NUC6520, NUC6940 and NUC6570 (available from Nippon Unicar Co., Ltd.). The ethylene acrylate copolymer may preferably have a weight-average molecular weight ranging from 1,000 to 100,000.

On the styrene copolymer used in the present invention, there are no particular limitations as long as it is capable of dissolving in the dispersion medium when used within the range of the present invention. It may specifically include a styrene isoprene copolymer, a styrene butadiene copolymer and a styrene maleic anhydride copolymer, any of which may be used alone or in the form of a mixture of two or more. In particular, a styrene butadiene copolymer is preferred, and, as commercially available materials, usable are E-SBR, S-SBR (available from JSR Corporation); NIPOL 1502, NIPOL 1712, NIPOL NS112, NIPOL NS116, NIPOL 1006, NIPOL 1009 (available from Nippon Zeon Co., Ltd.); TUFDEN, TUFPRENE, ASAPRENE (available from Asahi Chemical Industry Co., Ltd.); and SUMITOMO SBR (available from Sumitomo Chemical Co., Ltd.). The styrene copolymer may preferably have a weight-average molecular weight ranging from 1,000 to 200,000.

In the present invention, the dispersion medium may optionally be incorporated therein with a metal soap as a charge control agent. Relating also to the content of the ethylene acrylate copolymer and/or styrene copolymer contained in the dispersion medium according to the present invention, the incorporation of the metal soap tends to stabilize the charging of the charged electrophoretic particles. There are no particular limitations on the metal soap as long as it is soluble in the dispersion medium. It may include, e.g., cobalt naphthenate, zirconium naphthenate, copper naphthenate, iron naphthenate, lead naphthenate, manganese naphthenate, zinc naphthenate, cobalt octenoate, zirconium octenoate, iron octenoate, lead octenoate, nickel octenoate, manganese octenoate and zinc octenoate.

In the present invention, the dispersion medium may also optionally be incorporated therein with a rosin ester or a rosin derivative as a dispersion auxiliary agent of the charged electrophoretic particles. There are no particular limitations on the rosin ester or rosin derivative as long as it is soluble in the dispersion medium. It may include, e.g., gum rosin, wood rosin, tall oil rosin, rosin modified maleic acid, rosin modified pentaerythritol, rosin glycerol ester, partially hydrogenated rosin methyl ester, partially hydrogenated rosin glycerol ester, partially hydrogenated rosin triethylene glycol ester, completely hydrogenated rosin pentaerythritol ester, maleic acid modified rosin ester, fumaric acid modified rosin ester, acrylic acid modified rosin ester, maleic acid modified rosin pentaerythritol ester, fumaric acid modified rosin pentaerythritol ester, acrylic acid modified rosin glycerol ester, maleic acid modified rosin glycerol ester, fumaric acid modified rosin glycerol ester and acrylic acid modified rosin glycerol ester.

In the present invention, the dispersion medium may further optionally be incorporated therein with a polyethylene wax. Relating also to the content of the ethylene acrylate copolymer and/or styrene copolymer contained in the dispersion medium according to the present invention, the incorporation of the polyethylene wax tends to make the charged electrophoretic particles less adhere to the inner-wall surfaces. There are no particular limitations on the polyethylene wax as long as it is soluble in the dispersion medium. It may include, e.g., as commercially available products, AC Polyetylene (available from Tomen Plastic Sales Co.), MITSUI HIWAX (available from Mitsui Chemicals Inc.) and HOECHST WAX (available from Hoechst Japan Ltd.).

The dispersion medium according to the present invention may also optionally be incorporated therein with any of an anionic surface-active agent, a cationic surface-active agent, an amphoteric surface-active agent, a nonionic surface-active agent and a fluorine type surface-active agent which are soluble in the dispersion medium. Any of these may be used alone or in the form of a mixture of two or more.

The charged electrophoretic particles 1 used in the present invention are, in combination with a solvent used as the dispersion medium, those which are insoluble in the solvent and can be present in the state of particles dispersed in the solvent. The charged electrophoretic particles may also be composed of any of an inorganic coloring material, an organic pigment, a polymeric material and a mixture of any of these, without any particular limitations as long as they are within the scope of the present invention. The charged electrophoretic particles may be colored so as to be adapted to the manner of display of the electrophoretic display device to be used.

As the charged electrophoretic particles 1, particles composed of an inorganic coloring material may be used. The inorganic coloring material may include, as specific materials, white lead, zinc white, lithopone, titanium dioxide, zinc sulfide, antimony oxide, calcium carbonate, kaolin, mica, barium sulfate, gloss white, alumina white, talc, silica, calcium silicate, cadmium yellow, cadmium lithopone yellow, yellow iron oxide, titanium yellow, titanium barium yellow, cadmium orange, cadmium lithopone orange, molybdate orange, red ion oxide, red lead, silver vermilion, cadmium red, cadmium lithopone red, amber, brown iron oxide, zinc iron chromium brown, chromium green, chromium oxide, viridian, cobalt green, cobalt chromium green, titanium cobalt green, iron blue, cobalt blue, ultramarine blue, cerulean blue, cobalt aluminum chromium blue, cobalt violet, mineral violet, carbon black, black iron oxide, manganese ferrite black, cobalt ferrite black, copper chromium black, copper chromium manganese black, black titanium oxide, aluminum powder, copper powder, lead powder, tin powder and zinc powder. These inorganic coloring materials may be made into particles by known methods such as pulverization and granulation.

As the charged electrophoretic particles 1, particles composed of an organic pigment may also be used. The organic pigment may include, as specific materials, Fast Yellow, disazo yellow, condensed azo yellow, Anthrapyrimidine Yellow, Isoindoline Yellow, Copper Azomethine Yellow, Quinophtaloin Yellow, Benzimidazolone Yellow, nickel dioxime yellow, monoazo yellow lake, Dinitroaniline Orange, Pyrazolone Orange, Perinone Orange, Naphthol Red, Toluidine Red, Permanent Carmine, Brilliant Fast Scarlet, Pyrazolone Red, Rhodamine 6G Lake, Permanent Red, Lithol Red, BON Lake Red, Lake Red, Brilliant Carmine, Bordeaux 10B, Naphthol Red, Quinacridone Magenta, condensed azo red, Naphthol Carmine, Perilene Scarlet, condensed azo scarlet, Benzimidazolone Carmine, Anthraquinonyl Red, Perilene Red, Perilene Maroon, Quinacridone Maroon, Quinacridone Scarlet, Quinacridone Red, Diketopyrrolopyrrole Red, Benzimidazolone Brown, Phthalocyanine Green, Victoria Blue Lake, Phthalocyanine Blue, Fast Sky Blue, Alkali Blue Toner, Indanthrone Blue, Rhodamine B Lake, Methyl Violet Lake, Dioxane Violet and Naphthol Violet. These organic pigments may be made into particles by known methods such as pulverization and granulation.

In the present invention, the above inorganic coloring material particles and organic pigment particles may be used after they have been subjected to surface modification. As methods for the surface modification in such a case, various methods usually employed for pigment particles may be used. For example, such methods may include coating of pigment particle surfaces with various compounds such as polymeric materials, coupling treatment with various coupling agents of a titanate type, a silane type, an aluminum type, a fluorine type and so forth, and treatment by graft polymerization. These particles may also be subjected to mechanochemical treatment.

In addition, as the charged electrophoretic particles in the present invention, particles composed of a polymeric material may be used. As the polymeric material, there are no particular limitations thereon as long as it is insoluble in the dispersion medium. It may include polyesters, polyacrylates such as poly(methyl acrylate) and poly(ethyl acrylate), polymethacrylates such as poly(methyl methacrylate) and poly(ethyl methacrylate), polyacrylonitrile, polystyrene, divinylbenzene resins, polyurea resins, nylons, urethane resins, melamine resins, tetrafluoroethylene resins, phenolic resins, phenol novolak type epoxy resins, cresol novolak type epoxy resins, cycloaliphatic epoxy resins, glycidyl ester epoxy resins, and polymethacrylic esters.

The particles composed of the polymeric material may be obtained by a known method including polymerization methods such as dispersion polymerization (such as emulsion polymerization and suspension polymerization) and seed polymerization; a method in which particles are precipitated from a solution in which the polymeric material has been dissolved, followed by granulation; and a method in which the polymeric material is pulverized into particles. The polymeric material may also be used after it has been subjected to cross-linking treatment for the purpose of making it insoluble to the solvent. The particles composed of the polymeric material may still also be used after they have been colored. To color the particles composed of the polymeric material, they may be colored by a known method such as a method in which the particles are dyed with a dye; or a method in which the above inorganic coloring material and organic pigment are melt-kneaded with the polymeric material, followed by pulverization and then coloring.

The dye with which the particles are dyed may include, e.g., oil soluble dyes such as Valifast Red, Valifast Yellow, Oplas Red, Oil Scarlet (available from Orient Chemical Industries, Ltd.); Oil Blue V, Oil Green, Bright Green, Sudan IV, Sudan III (available from Daiwa Chemical Factory Co., Ltd.); Sumiplast Blue, Sumiplast Red HFG, Sumiplast Red HF4G, Sumiplast Yellow, Whiteflour B (available from Sumitomo Chemical Co., Ltd.); Macrolex Red GS (available from Bayer Japan Ltd.); Microlith Blue, Microlith Green (available from CIBA GEIGY Japan Limited); Orient Oil Black (available from Orient Chemical Industries, Ltd.); Sumikaron Brilliant Blue, Sumikaron Violet (available from Sumitomo Chemical Co., Ltd.); and Kayacryl Black, Kayalon Polyester Blue, Kayaron Polyester Red (available from Nippon Kayaku Co., ltd.).

As the charged electrophoretic particles used in the present invention, commercially available particles may also be used. Such particles may include, but are not particularly limited to, e.g., MICROPEARL (available from Sekisui Chemical Co., Ltd.), NATOCO Spacer Particles (available from Natoco Co., Ltd.), EPO Color Particles (available from Nippon Shokubai Co., Ltd.), CHEMISNOW (available from Soken Chemical & Engineering Co., Ltd.), TOSPEARL (GE Toshiba Silicone Co., Ltd.), and TECPOLYMER (Sekisui Kaseihin Kogyo K.K.)

The charged electrophoretic particles used in the present invention may also preferably have an average particle diameter ranging from 0.05 μm to 20 μm. In the present invention, if necessary, the particles may be classified by a known method such as dry-process classification or wet-process classification.

As the dispersion medium in which the charged electrophoretic particles used in the present invention are to be dispersed, a highly insulating organic solvent having a low conductivity is used. Stated specifically, it may include aromatic hydrocarbon solvents such as benzene, ethylbenzene, dodecylbenzene, toluene, xylene, and naphthene type hydrocarbons; aliphatic hydrocarbon solvents such as hexane, cyclohexane, kerosene, paraffin type hydrocarbon solvents and isoparaffin type hydrocarbon solvents; and halogenated hydrocarbon solvents such as chloroform, trichloroethylene, tetrachloroethylene, dichloromethane, trichlorotrifluoroethylene and bromoethyl; as well as silicone oil and high purity petroleum. In particular, aliphatic hydrocarbon solvents may preferably be used, and may specifically include ISOPER G, H, M, L (all available from Exxon Chemical Co.), SHELLSOL (available from Showa Shell Japan Ltd.), and IP Solvent 1016, 1620, 2028, 2835 (available from Idemitsu Petrochemical Co., Ltd.). Any of these may be used alone or in the form of a mixture of two or more.

Meanwhile, the dispersion medium used in the present invention may be colored a color different from that of the particles so as to be adapted to the manner of display of the electrophoretic display device to be used. As a colorant therefor, there are no particular limitations as long as it is oil soluble dye capable of dissolving in the dispersion medium. It may specifically include Spirit Black (SB, SSBB, AB), Nigrosine Base (SA, SAP, SAPL, EE, EEL, EX, EXBP, EB), Oil Yellow (105, 107, 129, 3G, GGS), Oil Orange (201, PS, PR), Fast Orange, Oil Red (5B, RR, OG), Oil Scarlet, Oil Pink 312, Oil Violet #730, Macrolex Blue RR, Sumiplast Green G, Oil Brown (GR, 416), Sudan Black X60, Oil Green (502, BG), Oil Blue (613, 2N, BOS), Oil Black (HBB, 860, BS), Valifast Yellow (1101, 1105, 3108, 4120), Varifast Orange (3209, 3210), Varifast Red (1306, 1355, 2303, 3304, 3306, 3320), Varifast Pink 2310N, Varifast Brown (2402, 3405), Varifast Blue (3405, 1501, 1603, 1605, 1607, 2606, 2610), Varifast Violet (1701, 1702), Varifast Black (1802, 1807, 3804, 3810, 3820, 3830), Oil Yellow 3G, Fast Orange G, Oil Red 5B, Sumiplast Green G, Oil Brown GR, Sudan Black X60; Valifast Red, Valifast Yellow, Oplas Red, Oil Scarlet (available from Orient Chemical Industries, Ltd.); Oil Blue V, Oil Green, Bright Green, Sudan IV, Sudan III (available from Daiwa Chemical Factory Co., Ltd.); Sumiplast Blue, Sumiplast Red HFG, Sumiplast Red HF4G, Sumiplast Yellow, Whiteflour B (available from Sumitomo Chemical Co., Ltd.); Macrolex Red GS (available from Bayer Japan Ltd.); Microlith Blue, Microlith Green (available from CIBA GEIGY Japan Limited); Orient Oil Black (available from Orient Chemical Industries, Ltd.); Sumikaron Brilliant Blue, Sumikaron Violet (available from Sumitomo Chemical Co., Ltd.); and Kayacryl Black, Kayalon Polyester Blue, Kayaron Polyester Red (available from Nippon Kayaku Co., ltd.).

In the present invention, two kinds or more of charged electrophoretic particles having different particle diameter, particle component or color may be used so as to be adapted to the manner of display of the electrophoretic display device to be used.

The dispersion for electrophoretic display according to the present invention is made up to contain the above dispersion medium and at least one copolymer selected from the ethylene acrylate copolymer and the styrene copolymer. Like what has been described previously, in the dispersion for electrophoretic display, the ethylene acrylate copolymer may preferably be contained in an amount ranging from 0.0001 to 1 part by weight based on 100 parts by weight of the dispersion medium, and the styrene copolymer in an amount ranging from 0.0001 to 3 parts by weight based on 100 parts by weight of the dispersion medium.

Figure 3A:
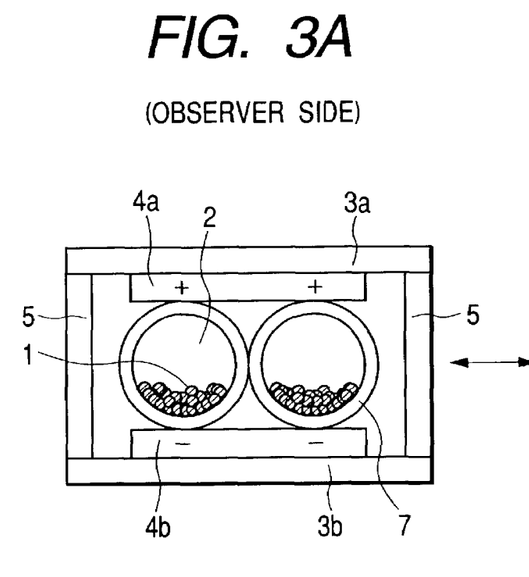
FIGS. 3A and 3B are schematic views showing still another example of the structure of the electrophoretic display device according to the present invention.
Figure 3B:
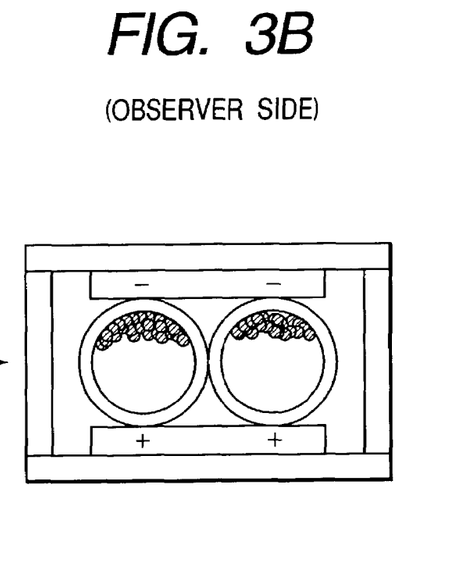

The dispersion for electrophoretic display which is comprised of the dispersion medium containing the copolymer according to the present invention may also be used in the state the charged electrophoretic particles 1 are dispersed in the dispersion medium 2 containing the copolymer and these are encapsulated in microcapsules 7 as shown in FIGS. 3A and 3B. As methods for the encapsulation in microcapsules, usual methods are available, such as in-situ encapsulation, interfacial polymerization and coacervation.

As a wall material of the microcapsules, it may include, polyurethane, polyurea, polyurea polyurethane, urea formaldehyde resins, melamine formaldehyde resins, polyamide, polyester, polysulfonamide, polycarbonate, polysulfinate, epoxy, polyacrylic esters, polymethacrylic esters, polyvinyl acetate, polyvinyl alcohol, and gelatin.

The microcapsules which may be used in the electrophoretic display device of the present invention may have a size of approximately from 1 to 500 μm, and preferably approximately from 20 to 100 μm, in diameter.

The charged electrophoretic particles in the present invention may be used in any desired weight ratio based on the dispersion medium. They may preferably be in a ratio ranging from 0.1 part by weight to 20 parts by weight based on 100 parts by weight of the dispersion medium.

The electrophoretic display device of the present invention is described below with reference to FIGS. 1A and 1B.

For the substrates 3a and 3b, usable are films of polymers such as polyethylene terephthalate (PET), polyether sulfone (PES), polyimide (PI), polyethylene naphthalate (PEN) and polycarbonate (PC), inorganic materials such as glass and quartz, and stainless-steel substrates having insulating layers on the surfaces. For the substrate 3a on the viewer (observer) side, a material having a high transmittance for visible light may preferably be used, as exemplified by transparent polymer film or transparent glass. On the substrate 3a, a polymeric material layer having a hardness ranging from 10 to 90, stated specifically, a silicon resin, natural rubber or thermoplastic elastomer layer may be formed on its surface coming into contact with the dispersion.

The electrodes 4a and 4b may be formed of any conductive material which can be patterned, without any particular limitations, which material may include, e.g., indium-tin oxide (ITO), aluminum and titanium. Incidentally, in the horizontal-movement type electrophoretic-display device shown in FIGS. 1A and 1B, one electrode 4b is formed over the whole pixel, and the other electrode 4a is formed at a height different from the electrode 4b in such a way that it overlaps with the electrode 4b at a part of the pixel. Without limitations thereto as a matter of course, both the electrodes 4a and 4b may be formed at the same height. In such a case, the electrode 4b can not be formed over the whole pixel, and the electrodes 4a and 4b do not overlap with each other. In other form, the electrode may be formed dividedly for each pixel.

An insulating layer 6 may further preferably be so formed as to cover the electrodes 4a and 4b. In the case when such an insulating layer 6 is formed, electric charges can be prevented from injecting from the respective electrodes 4a and 4b into the charged electrophoretic particles. As a material used for this insulating layer 6, it is preferable to use a material which is thin-film and can not easily form pinholes. It may specifically include highly transparent polyimide resins, polyester resins, polyacrylate resins, polymethacrylate resins, polycarbonate resins, polyarylate resins, novolak resins and epoxy resins.

In the partition walls 5, a polymer resin or the like may be used. It may specifically include polyimide resins, polyester resins, polyacrylate resins, polymethacrylate resins, polycarbonate resins, polyarylate resins, novolak resins and epoxy resins.

As a method of forming the partition walls 5, it may include a method in which a photosensitive resin layer is formed on one substrate by coating, followed by exposure and wet-process development; a method in which partition walls are formed by printing; a method in which partition walls are separately formed and thereafter bonded to the substrate; and a method in which partition walls are previously formed on the surface of a light-transmissive substrate by molding.

In the case of the horizontal-movement type, the area in which any one electrode of the electrode 4a (first electrode) and electrode 4b (second electrode) described above is disposed may be colored the same color as that of the charged electrophoretic particles 1 and the area in which the other electrode is disposed may be colored a different color. In such a case, the electrodes themselves may be colored, or colored layers may be provided separately from the electrodes, or insulating layers may be so formed as to lie on the tops of the electrodes and the insulating layers may be colored, any of which may be done.

In the case of the vertical-movement type, the dispersion medium 2 in which the charged electrophoretic particles are to be dispersed may be colored a color different from the particles 1.

These enable two-color display. Display may be performed in different colors in a plurality of adjoining pixels so that color display can be performed as the whole display device.

As described above, according to the present invention, at least one copolymer selected from the ethylene acrylate copolymer and the styrene copolymer is contained in the dispersion medium in which the charged electrophoretic particles stand dispersed. This can provide the dispersion for electrophoretic display which can keep the charged electrophoretic particles from agglomerating and the particles from adhering to the electrode surfaces and inner-wall surfaces. As the result, in the electrophoretic display device making use of the dispersion for electrophoretic display, a high contrast and a stable image condition can be maintained.

In addition, since only at least one copolymer selected from the ethylene acrylate copolymer and the styrene copolymer is contained in the dispersion medium in which the charged electrophoretic particles stand dispersed, a high-quality electrophoretic display device can be provided at a low cost and with ease.

The present invention is described below in greater detail by giving Examples of the horizontal-movement type electrophoretic display device.

EXAMPLE 1

Figure 4A:
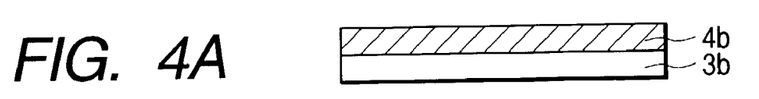
FIGS. 4A, 4B, 4C, 4D and 4E represent a flow sheet showing a process of manufacturing the electrophoretic display device according to the present invention.
Figure 4B:
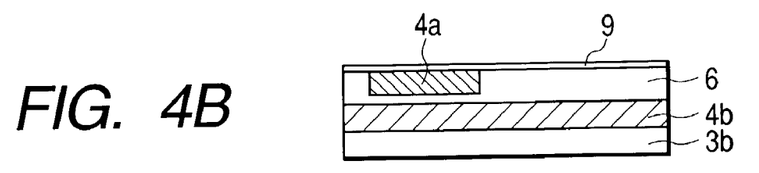
Figure 4C:
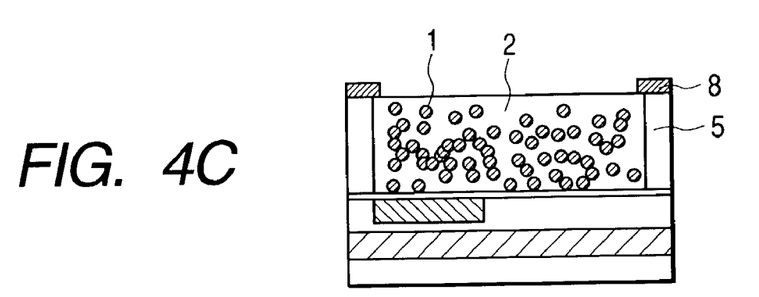
Figure 4D:
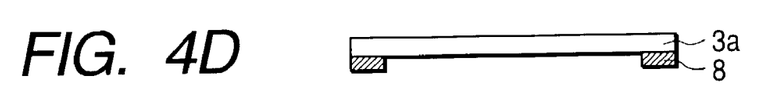
Figure 4E:
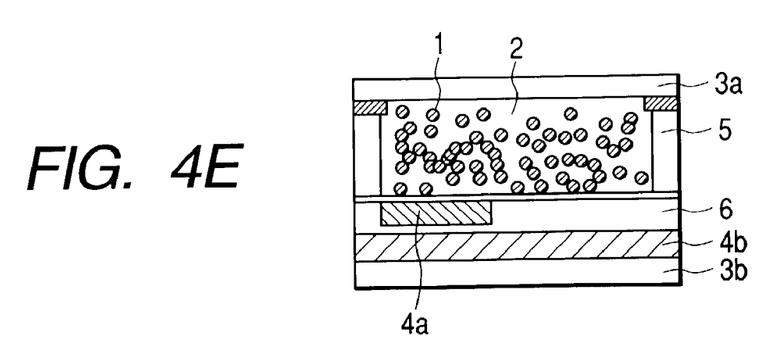

In this Example, an electrophoretic display device shown in FIG. 4E was produced. FIGS. 4A to 4E represent a flow sheet showing a process of manufacturing the electrophoretic display device according to the present invention.

First, on the surface of a substrate $3b$ polyimide (PI) film, aluminum was vacuum-deposited in a thickness of 100 nm to form a second electrode $4b$ (see FIG. 4A). Here, as the polyimide film, one having a size of 50 mm×50 mm and a thickness of 200 μm was used.

Next, on the surface of the second electrode $4b$, a polyurethane resin layer colored white by mixing fine titanium oxide particles was formed to provide an insulating layer 6.

At the surface of this insulating layer 6, a first electrode $4a$ was formed as shown in FIG. 4B, i.e., in such a way that it overlapped with the second electrode $4b$ at a part of each pixel. Then, on the insulating layer 6, a transparent resin layer 9 formed of polyacrylate resin (OPTOMER SS6699, available from JSR Corporation) was so formed as to cover this first electrode $4a$. Here, this first electrode $4a$ was formed by making dark-black titanium carbide into a film and patterning the film in lines by photolithography and dry etching. The first electrode $4a$ was in a thickness of 50 nm and a line width of 35 μm.

Then, on the surface of the insulating layer 6, partition walls 5 were so formed as to divide each pixel from another. The partition walls 5 were formed in a height of 30 μm, a width of 12 μm and an interval of 120 μm by carrying out the steps of coating a photosensitive epoxy resin (SU8, available from Magdarmid Japan Ltd.), followed by exposure and wet development. Thereafter, on the tops of the partition walls 5 (i.e., on the ends to be joined to a substrate $3a$), a heat-fusible adhesive layer 8 was formed (FIG. 4C).

Next, 1 part by weight of black-colored liquid-crystal spacer particles (hereinafter "particles A") (available from Natoco Co., Ltd.; average particle diameter: 6 μm) as charged electrophoretic particles 1, 100 parts by weight of an aliphatic hydrocarbon solvent ISOPER H (available from Exxon Chemical Co.) as the dispersion medium, 0.001 part by weight of an ethylene ethyl acrylate copolymer (DPDJ-6169, available from Nippon Unicar Co., Ltd.) as the ethylene acrylate copolymer and 0.01 part by weight of zirconium octenoate (Oct-Zr) (NIKKA OCTICS Zirconium, available from Nihon Kagaku Sangyo Co., Ltd.) as the metal soap were mixed, and stirred for 24 hours to prepare a dispersion. This dispersion thus prepared was filled into the spaces between the partition walls 5 (see FIG. 4C).

A substrate $3a$ formed of a PET film of 200 μm thick and the adhesive layer 8 were also registered (positionally adjusted) (see FIG. 4D) and thereafter the substrate $3a$ was heat-bonded to the partition wall 5 upper ends (as support members), thus the electrophoretic display device of the present invention was produced (see FIG. 4E). Incidentally, the top of the first electrode $4a$ looks in black color, and the top of the area where the first electrode $4a$ is not provided looks in white color.

Using the electrophoretic display device thus produced, display was performed at an applied voltage of ±50 V and a voltage application time of 10 msec. Good black-and-white display was performed.

The charged electrophoretic particles 1 used in this Example stand charged to positive polarity, and hence move swiftly onto the negative polarity electrode when voltage is applied. For example, where the second electrode $4b$ is set positive polarity and the first electrode $4a$ negative polarity, black charged electrophoretic particles 1 come moved to cover the first electrode $4a$, so that, when viewed from the viewer (observer) side of the substrate $3a$, black particles 1 and a white area (the area other than the first electrode $4a$) are seen, and it follows that the pixel performs white display (see FIG. 1A).

On the contrary, where the second electrode $4b$ is set negative polarity and the first electrode $4a$ positive polarity, black charged electrophoretic particles 1 move to the white area (the area other than the first electrode $4a$). Hence, when viewed from the viewer (observer) side of the substrate $3a$, the black first electrode $4a$ and the white insulating layer 6 covered with black particles 1 are seen, and it follows that the pixel performs black display (see FIG. 1B).

The response time was 30 msec. or less.

Next, switching the polarity of applied voltage at intervals of 0.5 second, the electrophoresis of particles between the first and second electrodes was repeated continuously for 2 weeks. After 2 weeks, agglomeration of particles and adhesion of particles to electrodes and inner-wall surfaces were observed.

As the result, in 2 weeks any particles were seen neither to have agglomerated nor to have adhered to electrodes and inner-wall surfaces.

EXAMPLES 2 TO 20

Tables 1 to 4 show components, and amounts thereof, contained in dispersions for electrophoretic display in these Examples. In all Examples, like Example 1, the particles A (1 part by weight) were used as the charged electrophoretic particles and the aliphatic hydrocarbon solvent ISOPER H (available from Exxon Chemical Co.) (100 parts by weight) was used as the dispersion medium. The components contained in the dispersions for electrophoretic display, itemed in Tables 1 to 4 are shown below.

Ethylene acrylate copolymer: Ethylene ethyl acrylate copolymers DPDJ 6169, NUC 6940, NUC 6220 (all available from Nippon Unicar Co., Ltd.).

Styrene copolymer: Styrene butadiene copolymers ASAPRENE 1205, ASAPRENE 303, TUFDEN 2003 (all available from Asahi Chemical Industry Co., Ltd.).

Metal soap: Zirconium octenoate (Oct-Zr) NIKKA OCTICS Zirconium (available from Nihon Kagaku Sangyo Co., Ltd.), cobalt naphthenoate (Na—Co) (available from Kishida Chemical Co., Ltd.).

Rosin ester or rosin ester derivative: Rosin esters NEOTALL 125H, HARIESTER DS130, NEOTALL 125H (all available from Harima Chemicals, Inc.).

Polyethylene wax: AC6, AC9, AC1702 (all available from Tomen Plastic Co.)

In all Examples also, dispersions for electrophoretic display were prepared as formulated in Tables 1 to 4 and by the same method as that in Example 1.

Next, in the same manner as in Example 1, electrophoretic display devices were produced, and display was performed at an applied voltage of ±50 V and a voltage application time of 10 msec. Like Example 1, good black-and-white display was performed. The response time was 30 msec. or less. Incidentally, the charged electrophoretic particles in all Examples also stood positively charged.

Then, switching the polarity of applied voltage at intervals of 0.5 seconds, the electrophoresis of particles between the first and second electrodes was repeated continuously for 2 weeks. After 2 weeks, agglomeration of particles and adhesion of particles to electrodes and inner-wall surfaces were observed.

As the result, in all Examples 2 to 20 shown in Tables 1 to 4, after 2 weeks any particles were seen neither to have agglomerated nor to have adhered to electrodes and inner-wall surfaces.

EXAMPLES 21 & 22

Table 5 shows components, and amounts thereof, contained in dispersions for electrophoretic display in Examples 21 and 22. In both Examples, 1 part by weight of polystyrene particles containing 10% by weight of carbon black as a colorant and having an average particle diameter of 3 μm (hereinafter "particles B") were used as the charged electrophoretic particles and 100 parts by weight of an aliphatic hydrocarbon solvent ISOPER H (available from Exxon Chemical Co.) was used as the dispersion medium.

In both Examples also, dispersions for electrophoretic display were prepared as formulated in Table 5 and by the same method as that in Example 1. In Table 5, the same components as those shown in Tables 1 to 4 are the same ones described in Example 2 to 20.

Next, in the same manner as in Example 1, electrophoretic display devices were produced, and display was performed at an applied voltage of ±50 V and a voltage application time of 10 msec. Like Example 1, good black-and-white display was performed. The response time was 30 msec. or less. Incidentally, the charged electrophoretic particles (particles B) in these Examples was charged to negative polarity.

The charged electrophoretic particles 1 used in this Example stand charged to negative polarity, and hence move swiftly onto the positive polarity electrode when voltage is applied. For example, where the second electrode 4b is set positive polarity and the first electrode 4a negative polarity, black charged electrophoretic particles 1 move to a white area (the area other than the first electrode 4a). Hence, when viewed from the viewer (observer) side of the substrate 3a, the black first electrode 4a and the white insulating layer 6 covered with black particles 1 are seen, and it follows that the pixel performs black display.

On the contrary, where the second electrode 4b is set negative polarity and the first electrode 4a positive polarity, black charged electrophoretic particles 1 come moved to cover the first electrode 4a, so that, when viewed from the viewer (observer) side of the substrate 3a, black particles 1 and the white area (the area other than the first electrode 4a) are seen, and it follows that the pixel performs white display.

Then, switching the polarity of applied voltage at intervals of 0.5 second, the electrophoresis of particles between the first and second electrodes was repeated continuously for 2 weeks. After 2 weeks, agglomeration of particles and adhesion of particles to electrodes and inner-wall surfaces were observed.

In both Examples 21 and 22 shown in Table 5, after 2 weeks any particles were seen neither to have agglomerated nor to have adhered to electrodes and inner-wall surfaces.

EXAMPLES 23 & 24

Table 5 shows components, and amounts thereof, contained in dispersions for electrophoretic display in Examples 23 and 24. In both Examples, 1 part by weight of polyester particles containing 7% by weight of carbon black as a colorant and having an average particle diameter of 2 μm (hereinafter "particles C") were used as the charged electrophoretic particles and 100 parts by weight of an aliphatic hydrocarbon solvent ISOPER H (available from Exxon Chemical Co.) was used as the dispersion medium.

In both Examples also, dispersions for electrophoretic display were prepared as formulated in Table 5 and by the same method as that in Example 1.

Next, in the same manner as in Example 1, electrophoretic display devices were produced, and display was performed at an applied voltage of ±50 V and a voltage application time of 10 msec. Like Example 1, good black-and-white display was performed. The response time was 30 msec. or less. Incidentally, the particles C used in these Examples stood charged to negative polarity like the particles B in Examples 21 and 22, and hence moved swiftly onto the positive polarity electrode when voltage was applied.

Then, switching the polarity of applied voltage at intervals of 0.5 second, the electrophoresis of particles between the first and second electrodes was repeated continuously for 2 weeks. After 2 weeks, agglomeration of particles and adhesion of particles to electrodes and inner-wall surfaces were observed.

In both Examples 23 and 24 shown in Table 5, after 2 weeks any particles were seen neither to have agglomerated nor to have adhered to electrodes and inner-wall surfaces.

COMPARATIVE EXAMPLE 1

A dispersion for electrophoretic display in Comparative Example 1 contained 100 parts by weight of an aliphatic hydrocarbon solvent ISOPER H (available from Exxon Chemical Co.) as the dispersion medium 2 and, as shown in Table 6, 1 part by weight of the particles A as the charged electrophoretic particles 1 and 0.03 part by weight of zirconium octenoate (Oct-Zr) (NIKKA OCTICS Zirconium, available from Nihon Kagaku Sangyo Co., Ltd.) as the metal soap, and was prepared by the same method as that in Example 1.

Next, in the same manner as in Example 1, an electrophoretic display device was produced, and display was performed at an applied voltage of ±50 V and a voltage application time of 10 msec. As the result, like Examples 1 to 24, good black-and-white display was performed. The response time was 30 msec. or less. Incidentally, the charged electrophoretic particles in Comparative Example 1 was charged to positive polarity.

Then, switching the polarity of applied voltage at intervals of 0.5 second, the electrophoresis of particles between the first and second electrodes was repeated continuously for 2 weeks. After 2 weeks, agglomeration of particles and adhesion of particles to electrodes and inner-wall surfaces were observed.

After 2 weeks, the particles were seen to have agglomerated and have adhered to electrodes and inner-wall surfaces in a large number.

COMPARATIVE EXAMPLE 2

A dispersion for electrophoretic display in Comparative Example 2 contained 100 parts by weight of an aliphatic hydrocarbon solvent ISOPER H (available from Exxon Chemical Co.) as the dispersion medium 2 and, as shown in Table 6, 1 part by weight of the particles A as the charged electrophoretic particles 1 and 1.5 parts by weight of an ethylene ethyl acrylate copolymer DPDJ-6169 (available from Nippon Unicar Co., Ltd.) as the ethylene acrylate copolymer, and was prepared by the same method as that in Example 1. However, precipitates came formed in the dispersion for electrophoretic display thus prepared, to make it unable to produce an electrophoretic display device.

COMPARATIVE EXAMPLE 3

A dispersion for electrophoretic display in Comparative Example 3 contained 100 parts by weight of an aliphatic hydrocarbon solvent ISOPER H (available from Exxon Chemical Co.) as the dispersion medium 2 and, as shown in Table 6, 1 part by weight of the particles A as the charged electrophoretic particles 1 and 4 parts by weight of a styrene butadiene copolymer ASAPRENE (available from Asahi Chemical Industry Co., Ltd.) as the styrene copolymer, and was prepared by the same method as that in Example 1. The dispersion for electrophoretic display thus prepared was one having a high viscosity, compared with that of Examples 1 to 24.

Next, in the same manner as in Example 1, an electrophoretic display device was produced, and display was performed at an applied voltage of ±50 V and a voltage application time of 10 msec. As the result, the electrophoresis of particles was too unstable to perform any good black-and-white display.

TABLE 1

| | Type and amount of charged electrophoretic particles (pbw) | Components, and amounts thereof, contained in dispersion medium | | | | |
|---|---|---|---|---|---|---|
| | | Ethylene acrylate copolymer (pbw) | Styrene copolymer (pbw) | Metal soap (pbw) | Rosin ester or rosin derivative (pbw) | Polyethylene wax (pbw) |
| Example: | | | | | | |
| 1 | Particles A (1) | DPDJ6169 (0.001) | none | Oct-Zr (0.01) | none | none |
| 2 | Particles A (1) | DPDJ6169 (0.8) | none | none | none | none |
| 3 | Particles A (1) | none | ASAPRENE 1205 (0.002) | Oct-Zr (0.001) | none | none |
| 4 | Particles A (1) | none | ASAPRENE 1205 (2.5) | none | none | none |
| 5 | Particles A (1) | DPDJ6169 (0.001) | ASAPRENE 1205 (0.002) | none | none | none | pbw: parts by weight

TABLE 2

| | Type and amount of charged electrophoretic particles (pbw) | Components, and amounts thereof, contained in dispersion medium | | | | |
|---|---|---|---|---|---|---|
| | | Ethylene acrylate copolymer (pbw) | Styrene copolymer (pbw) | Metal soap (pbw) | Rosin ester or rosin derivative (pbw) | Polyethylene wax (pbw) |
| Example: | | | | | | |
| 6 | Particles A (1) | DPDJ6169 (0.8) | ASAPRENE 1205 (2.5) | none | none | none |
| 7 | Particles A (1) | DPDJ6169 (0.1) | ASAPRENE 1205 (0.8) | Oct-Zr (0.03) | none | none |
| 8 | Particles A (1) | DPDJ6169 (0.1) | ASAPRENE 1205 (0.8) | none | NEOTALL 125H (2.5) | none |
| 9 | Particles A (1) | DPDJ6169 (0.1) | ASAPRENE 1205 (0.8) | none | none | AC6 (0.2) |
| 10 | Particles A (1) | DPDJ6169 (0.1) | ASAPRENE 1205 (0.8) | Oct-Zr (0.03) | NEOTALL 125H (2.5) | none | pbw: parts by weight

TABLE 3

| | Type and amount of charged electrophoretic particles (pbw) | Components, and amounts thereof, contained in dispersion medium | | | | |
|---|---|---|---|---|---|---|
| | | Ethylene acrylate copolymer (pbw) | Styrene copolymer (pbw) | Metal soap (pbw) | Rosin ester or rosin derivative (pbw) | Polyethylene wax (pbw) |
| Example: | | | | | | |
| 11 | Particles A (1) | DPDJ6169 (0.1) | ASAPRENE 1205 (0.8) | none | NEOTALL 125H (2.5) | AC6 (0.2) |
| 12 | Particles A (1) | DPDJ6169 (0.1) | ASAPRENE 1205 (0.8) | Oct-Zr (0.03) | none | AC6 (0.2) |
| 13 | Particles A (1) | DPDJ6169 (0.003) | ASAPRENE 1205 (0.03) | Oct-Zr (0.001) | NEOTALL 125H (0.1) | AC6 (0.01) |
| 14 | Particles A (1) | DPDJ6169 (0.1) | ASAPRENE 1205 (0.8) | Oct-Zr (0.03) | NEOTALL 125H (2.5) | AC6 (0.2) |
| 15 | Particles A (1) | DPDJ6169 (0.003) | none | Oct-Zr (0.001) | NEOTALL 125H (0.1) | none | pbw: parts by weight

TABLE 4

| | Type and amount of charged electrophoretic particles (pbw) | Components, and amounts thereof, contained in dispersion medium | | | | |
|---|---|---|---|---|---|---|
| | | Ethylene acrylate copolymer (pbw) | Styrene copolymer (pbw) | Metal soap (pbw) | Rosin ester or rosin derivative (pbw) | Polyethylene wax (pbw) |
| Example: | | | | | | |
| 16 | Particles A (1) | DPDJ6169 (0.1) | none | Oct-Zr (0.03) | NEOTALL 125H (2.5) | none |
| 17 | Particles A (1) | none | ASAPRENE 1205 (0.03) | Oct-Zr (0.001) | NEOTALL 125H (0.1) | none |
| 18 | Particles A (1) | none | ASAPRENE 1205 (0.8) | Oct-Zr (0.03) | NEOTALL 125H (2.5) | none |
| 19 | Particles A (1) | NUC6940 (0.1) | ASAPRENE 303 (0.8) | Na—Co (0.03) | HARIESTER DS130 (2.5) | AC1702 (0.2) |
| 20 | Particles A (1) | NUC6220 (0.1) | TUFDEN 2003 (0.8) | Oct-Zr (0.03) | NEOTALL G (0.1) | AC9 (0.2) | pbw: parts by weight

TABLE 5

| | Type and amount of charged electrophoretic particles (pbw) | Components, and amounts thereof, contained in dispersion medium | | | | |
|---|---|---|---|---|---|---|
| | | Ethylene acrylate copolymer (pbw) | Styrene copolymer (pbw) | Metal soap (pbw) | Rosin ester or rosin derivative (pbw) | Polyethylene wax (pbw) |
| Example: | | | | | | |
| 21 | Particles B (1) | DPDJ6169 (0.003) | ASAPRENE 1205 (0.03) | Oct-Zr (0.001) | NEOTALL 125H (0.1) | AC6 (0.01) |
| 22 | Particles B (1) | DPDJ6169 (0.1) | ASAPRENE 1205 (0.8) | Oct-Zr (0.03) | NEOTALL 125H (2.5) | AC6 (0.2) |
| 23 | Particles C (1) | DPDJ6169 (0.003) | ASAPRENE 1205 (0.03) | Oct-Zr (0.001) | NEOTALL 125H (0.1) | AC6 (0.01) |
| 24 | Particles C (1) | DPDJ6169 (0.1) | ASAPRENE 1205 (0.8) | Oct-Zr (0.03) | NEOTALL 125H (2.5) | AC6 (0.2) | pbw: parts by weight

TABLE 6

| | Type and amount of charged electrophoretic particles (pbw) | Components, and amounts thereof, contained in dispersion medium | | | | |
|---|---|---|---|---|---|---|
| | | Ethylene acrylate copolymer (pbw) | Styrene copolymer (pbw) | Metal soap (pbw) | Rosin ester or rosin derivative (pbw) | Polyethylene wax (pbw) |
| Comparative Example: | | | | | | |
| 1 | Particles A (1) | none | none | Oct-Zr (0.03) | none | none |
| 2 | Particles A (1) | DPDJ6169 (1.5) | none | none | none | none |
| 3 | Particles A (1) | none | ASAPRENE 1205 (4) | none | none | none | pbw: parts by weight

What is claimed is:

1. An electrophoretic display device; comprising:

a pair of substrates;

electrodes formed on the substrates;

charged electrophoretic particles held between the substrates; and a dispersion medium, in which the charged electrophoretic particles stand dispersed and are moved by applying a voltage to the electrodes, is disposed between the substrates, wherein the dispersion medium contains an aliphatic hydrocarbon solvent and at least one of an ethylene acrylate copolymer in a content of from 0.0001 part by weight to 0.3 part by weight based on 100 parts by weight of the dispersion medium and a styrene copolymer in a content of from 0.0001 part by weight to 3 parts by weight based on 100 parts by weight of the dispersion medium.

2. The electrophoretic display device according to claim 1, wherein the ethylene acrylate copolymer is an ethylene ethyl acrylate copolymer.

3. The electrophoretic display device according to claim 1, wherein the content of the ethylene acrylate copolymer ranges from 0.001 part by weight to 0.3 part by weight based on 100 parts by weight of the dispersion medium.

4. The electrophoretic display device according to claim 1, wherein the styrene copolymer is a styrene butadiene copolymer.

5. The electrophoretic display device according to claim 1, wherein the styrene copolymer is in a content ranging from 0.01 part by weight to 1 part by weight based on 100 parts by weight of the dispersion medium.

6. The electrophoretic display device according to claim 1, wherein the dispersion medium is incorporated therein with at least one of a metal soap, a rosin ester or a rosin derivative and a polyethylene wax.

* * * * *